US010330543B1

(12) United States Patent
Rogers (10) Patent No.: US 10,330,543 B1
(45) Date of Patent: Jun. 25, 2019

(54) MEASUREMENT OF TENSION IN SECURING MEMBERS

(71) Applicant: Avangrid Renewables, LLC, Portland, OR (US)

(72) Inventor: Donald Rogers, Portland, OR (US)

(73) Assignee: Avangrid Renewables, LLC, Portland, OR (US)

(*) Notice: Subject to any disclaimer, the term of this patent is extended or adjusted under 35 U.S.C. 154(b) by 0 days.

(21) Appl. No.: 15/944,695

(22) Filed: Apr. 3, 2018

(51) Int. Cl.
*G01L 5/00* (2006.01)
*G01L 5/18* (2006.01)
*F16B 31/04* (2006.01)

(52) U.S. Cl.
CPC .............. *G01L 5/0033* (2013.01); *G01L 5/18* (2013.01); *F16B 31/04* (2013.01)

(58) Field of Classification Search
CPC ........... G01L 5/0033; G01L 5/18; F16B 31/04
USPC .......................................................... 73/788
See application file for complete search history.

(56) References Cited

U.S. PATENT DOCUMENTS

| | | | | |
|---|---|---|---|---|
| 5,029,592 A * | 7/1991 | Schultz | ................. | A61B 5/224 600/587 |
| 6,148,676 A * | 11/2000 | Bergs | ...................... | G01N 3/06 73/800 |
| 8,584,430 B2 | 11/2013 | Tarr | | |
| 2013/0247682 A1* | 9/2013 | Oh | ........................ | B81C 99/005 73/826 |
| 2017/0269057 A1* | 9/2017 | Feng | ........................ | G01N 3/24 |

* cited by examiner

*Primary Examiner* — Max H Noori
(74) *Attorney, Agent, or Firm* — Klarquist Sparkman, LLP (57) ABSTRACT

A method to determine an unknown, current pre-tension force in a pre-tensioned securing member having an exposed portion comprises coupling a pulling member to the exposed portion of the pre-tensioned securing member, generating pulling forces with the pulling member on the pre-tensioned securing member, measuring pulling force displacements of the pre-tensioned securing member in response to first and second applied pulling forces that are different from each other, measuring pulling force displacements of the pre-tensioned securing member in response to third and fourth pulling forces that are different from each other, determining a first relationship between the first and second pulling force displacements, determining a second relationship between the third and fourth pulling force displacements, and determining the current pre-tension in the pre-tensioned securing member by setting the first relationship and the second relationship equal to each other.

20 Claims, 8 Drawing Sheets

MEASUREMENT OF TENSION IN SECURING MEMBERS

BACKGROUND

This application relates to measurement of tension in securing members, including bolts, studs and other securing members used to support structures and heavy equipment.

Tension in bolts, studs and other securing members, which is also referred to herein as pre-tension or preload, is generally developed when a threaded connection is tightened to create a compressive force in the bolted joint. If pre-tension in a securing member changes from a specified value, then the joint can become loosened and fail, which can have very serious consequences, especially in the case of securing members used in the foundations of large structures, such as bridges, wind turbines and other structures and assemblies. Securing members are routinely inspected and tested, but conventional approaches are sometimes complicated, not applicable in all settings and/or prone to error.

SUMMARY

Described below are methods and apparatus for determining pretension in a securing member that lead to accurate results in a more efficient way and require fewer necessary parameters.

According to a one implementation, a method to determine an unknown, current pre-tension force in a pre-tensioned securing member having an exposed portion, comprises coupling a pulling member to the exposed portion of the pre-tensioned securing member, generating pulling forces with the pulling member on the pre-tensioned securing member, measuring pulling force displacements of the pre-tensioned securing member in response to first and second applied pulling forces that are different from each other, and measuring pulling force displacements of the pre-tensioned securing member in response to third and fourth pulling forces that are different from each other. A first relationship between the first and second pulling force displacements is determined. A second relationship between the third and fourth pulling force displacements is determined. The current pre-tension in the pre-tensioned securing member is determined by setting the first relationship and the second relationship equal to each other.

The first and second pulling forces may be selected to be less than the current pre-tension force. The third and the fourth pulling forces may be selected to be greater than the current pre-tension force. The total length of the pre-tensioned securing member may be unknown, its cross-sectional area and/or its modulus of elasticity may be unknown.

The first relationship between the first and second pulling forces may comprise a linear relationship. The second relationship between the third and fourth pulling forces may comprise a linear relationship.

The method may further comprise comparing the determined current pre-tension force to a reference pre-tension force, and adjusting the current pre-tension force to equal the reference pre-tension force.

The foregoing and other objects, features, and advantages of the invention will become more apparent from the following detailed description, which proceeds with reference to the accompanying figures.

DETAILED DESCRIPTION

Figure 1:
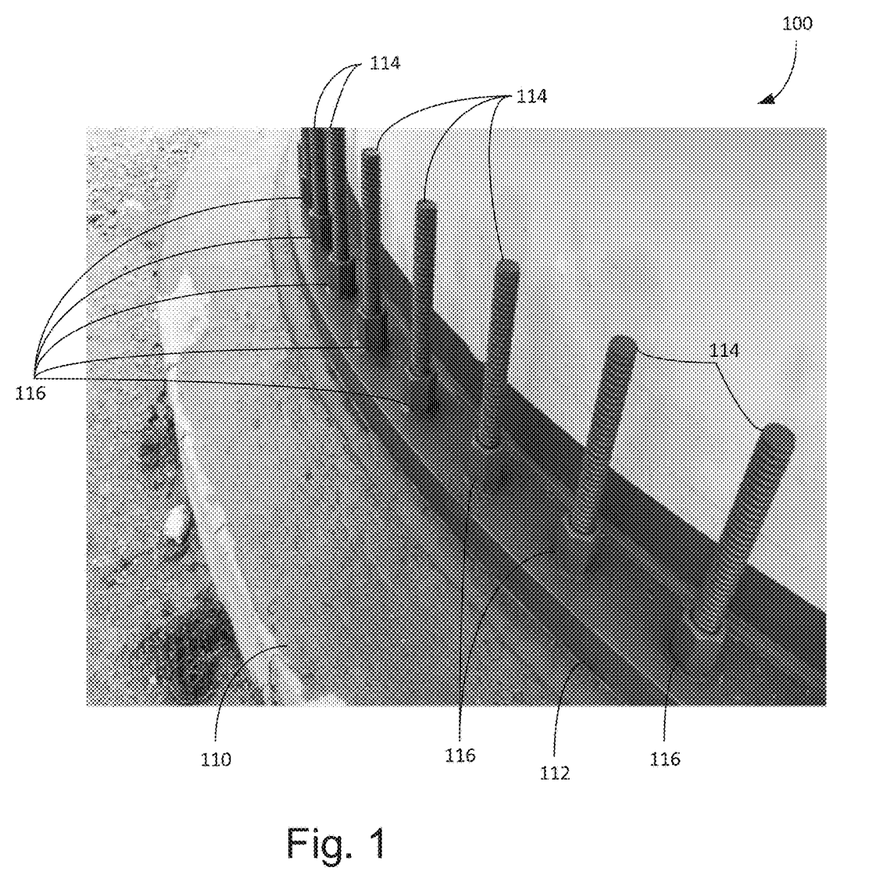
FIG. 1 is a perspective view of a portion of a foundation showing several securing members arranged around a periphery thereof and protruding from an upper surface.
Figure 2A:
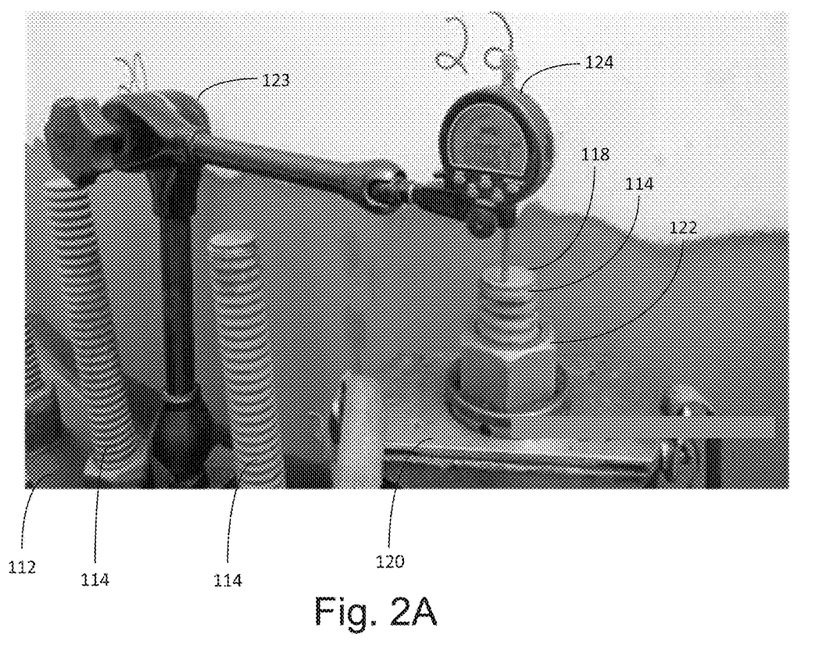
FIG. 2A is a first perspective view showing one of the securing members with a measuring device positioned to measure its displacement and a device with which a pulling force can be exerted on the securing member.
Figure 2B:
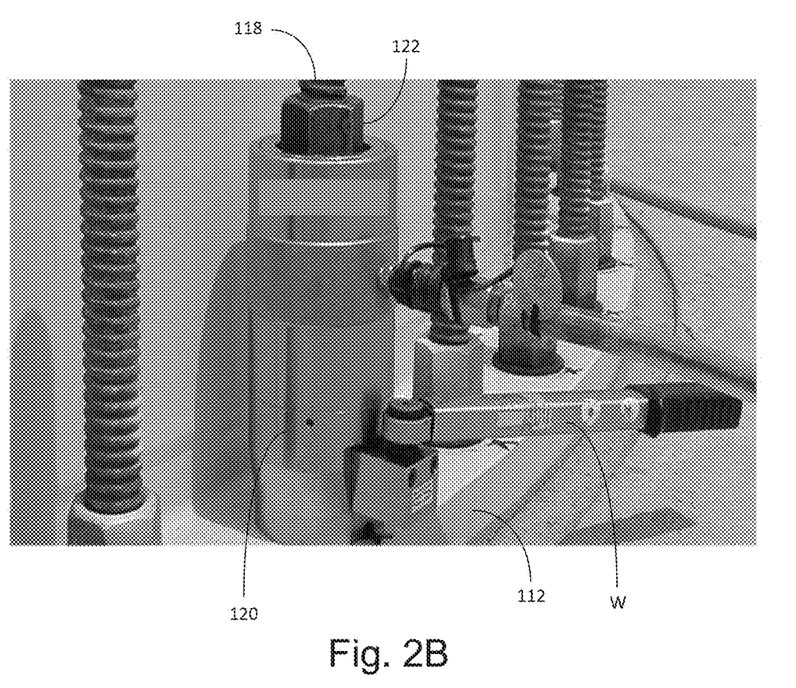
FIG. 2B is another perspective view showing the pulling device.

Described below are methods and apparatus for determining pre-tension of a securing member, e.g., in a foundation for a large structure or other similar application. Referring to FIGS. 1, 2A and 2B, a typical foundation 100 used to stabilize large structures, including wind turbines, is shown.

FIG. 1 is a perspective view showing a portion of the foundation 100 having a base flange 112 that is secured in place by a securing members 114 that are spaced apart about the base flange 112, which in this example is circular in shape. The base flange 112, which is made of metal, is supported on a pad 110, which is typically made of concrete. In the illustrated implementation, the securing members 114 are bolts or studs as described in more detail below, but other types of threaded fasteners and securing members generally can also be used.

Figure 3:
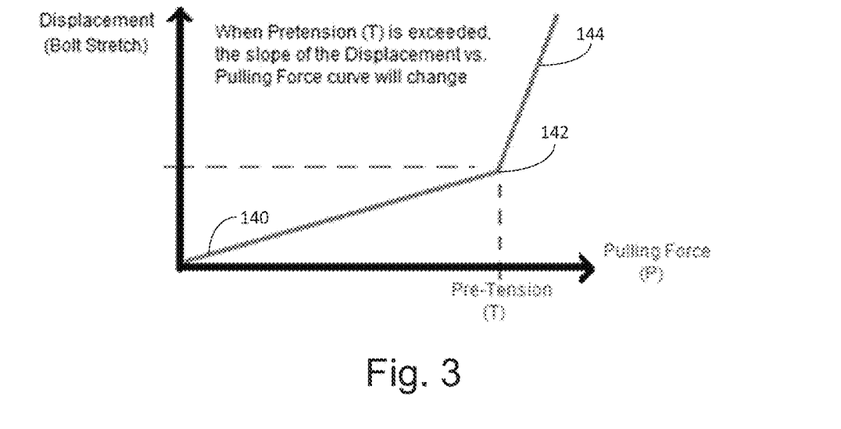
FIG. 3 is a graph showing a relationship between a pre-tension force in the securing member and its displacement.

Each of the securing members 114 as shown in FIGS. 1 and 2A extends substantially vertically and has its free end 118 (or distal end) oriented upwardly. Each securing member 114 has an exposed length 132 (FIG. 3) extending from the free end 118 to a holding member 116, which in this example is a conventional nut or other threaded fastener. As best seen in FIG. 3, each securing member 114 has a substantial concealed length 150 extending from the exposed length 132, downwardly through the base flange 112, the pad 110 and other layers and/or materials, to a fixed end 130 (or proximal end), which is typically secured within an embedment ring (not shown). In some installations, the securing members 114 are 10 feet long, with the fixed end 130 secured in an embedment ring at 8 feet below the surface and the remaining length (18 to 24 inches) extending above the base flange 112.

During initial installation, the securing members 114 are configured to have a predetermined force or tension T, called "pre-tension" or "preload," developed therein to assist in supporting the structure. Two common ways to develop tension in a bolt are by torque (e.g., rotating the nut and/or bolt head) or direct tension. In a typical installation, the securing member 114 is stretched with a conventional pulling tool by a desired amount. A pulling tool or tensioning tool, such as a pulling tool 120, as described below in connection with FIGS. 2A and 2B, or a different type of pulling tool can be used. One exemplary pulling tool or tensioning tool is the Enerpac Power Generation Bolt Tensioners available from Enerpac (www.enerpac.com).

While the securing member 114 is maintained in a stretched state at a predetermined pre-tension T with the pulling tool, the holding member or nut 116 is tightened until it makes good contact with the surrounding surface of the securing member 114 (or any intermediate member, such as a washer (see, e.g., washer 117 in FIG. 4)), thereby establishing the pre-tension in bolted connection. Depending on requirements of the specific components of the connection, lubrication of the components may be recommended.

Following installation, the securing members 114 may be periodically evaluated as part of a maintenance program for the foundation 100. One specific maintenance requirement is evaluating the pre-tension T of the securing members 114 to determine if it has changed from a pre-set value (specification) established at installation and needs to be reestablished.

Referring to FIGS. 2A and 2B, steps of a representative method and related apparatus for measuring pre-tension in a pre-tensioned securing member 114 are shown. In this example, it is assumed that the pre-tension in one of the securing members 114 has decreased over time below specification, and therefore must have its tension increased (other similar procedures would be followed if the pre-tension needed to be decreased to meet specifications). A conventional pulling device 120 (or bolt tensioner) has been installed on one of the securing members 114 (FIGS. 2A and 2B show slightly different implementations of conventional bolt tensioners that operate according to the same principle). A lower portion of the pulling device 120 is positioned to bear against the base flange 112 or another stationary part of the foundation 100 (FIG. 2B). A pulling nut 122 is then threaded over the end of the securing member 114 and snugged against the upper surface of the pulling device 120. The pulling device 120 is then operated to exert a pulling force, e.g., generated through hydraulic power supplied to the device, on the base flange 112 and the pulling nut 122, and in turn, on the pre-tensioned securing member 114. As shown in FIG. 2A, a conventional displacement measuring device 124 is used to measure displacement of the securing member 114 while the pulling force is applied. In the illustrated implementation, the displacement measuring device 124 is in contact with the securing member 114, such as at the free end 118, and configured to display displacement thereof on a digital display. The displacement measuring device 124 is supported and stabilized against undesired movement by a mount 126, which can be positioned as shown on the base flange 112 or on another stationary surface. Once the desired pulling force (pre-tension) is reached, the nut 116 is rotated, i.e., typically in a tightening direction, such as with a torque wrench W (FIG. 2B).

Figure 4:
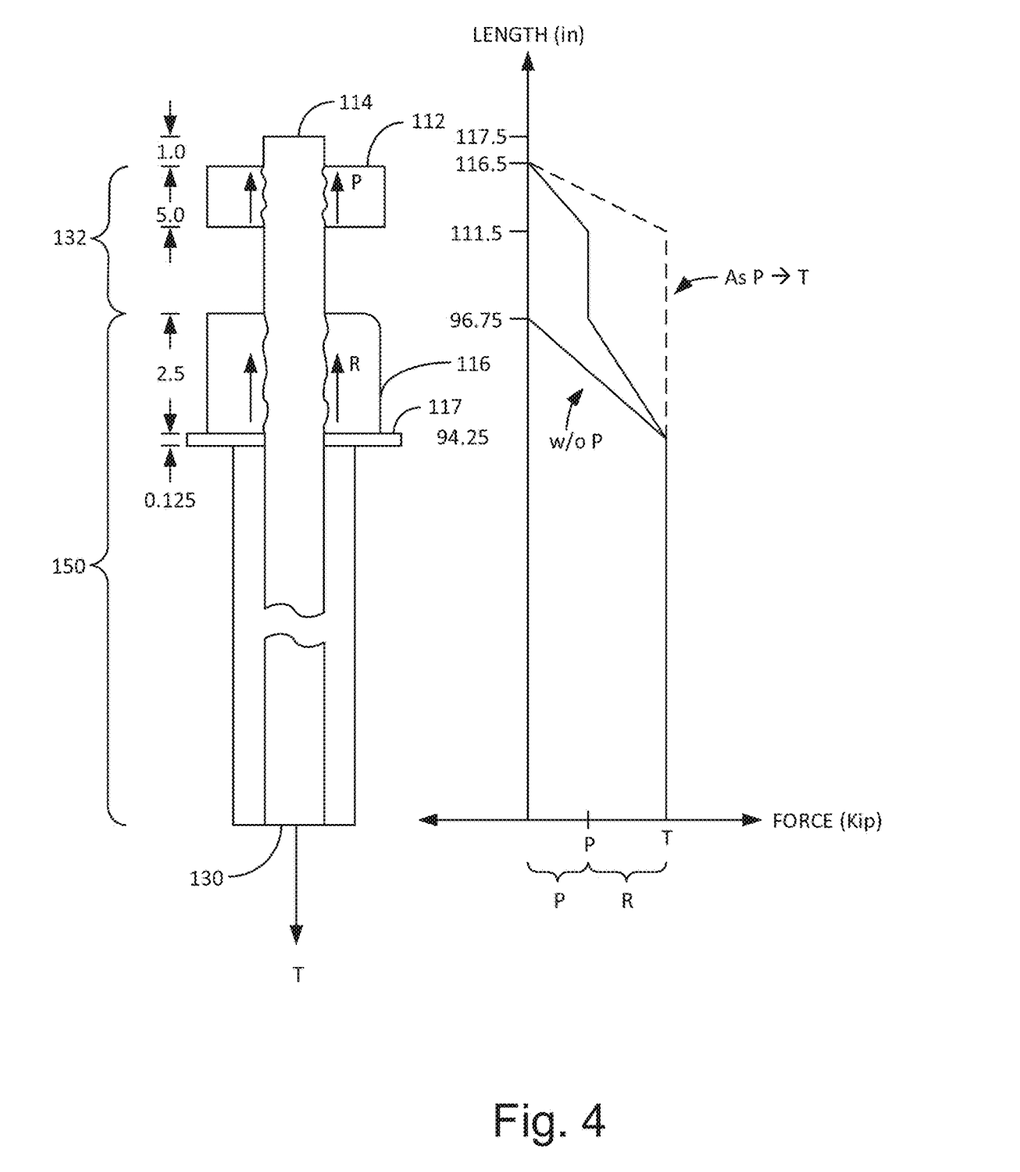
FIG. 4 is a side elevation view of one of the securing members showing the forces exerted on the securing member, together with an associated graph depicting magnitudes of the forces at different points along the length of the securing member.

FIG. 4 is a side elevation view of the securing member 114 currently being tested. FIG. 4 is also a free body diagram that shows the forces acting on the securing member and an associated graph depicting force exerted at different positions over the length of the securing member. Thus, the current pre-tension force T is shown acting downwardly, whereas a reaction force R exerted by the nut 116 acts in the opposite upward direction. Similarly, the pulling force P exerted by the pulling nut 122 exerts the pulling force in an upward direction as shown.

Initially, when the pulling force P is zero, the reaction force R is equal and opposite to the pre-tension force T. As the pulling force is increased from zero to T, the reaction force R provided by the nut 116 decreases from its initial value of R (which is equal to T) to zero. When the pulling force P is less than T, only the exposed portion 132 is stretched (i.e., only the length 132 between the nut 116 and the nut 122 is elongated).

Figure 5:
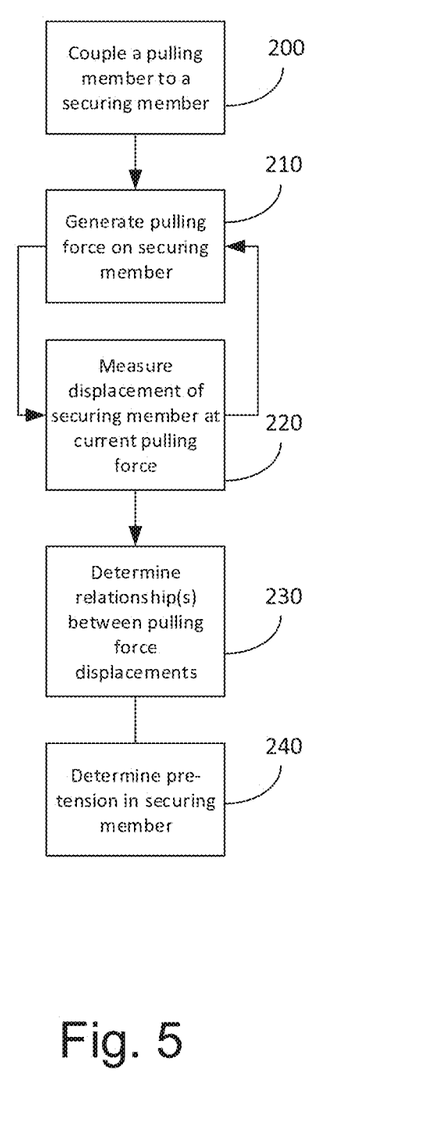
FIG. 5 is a flow chart of a method for determining pre-tension in the securing members.

The basic equation for the displacement or stretch of the securing member due to the applied pulling force P is $$\delta^- = \frac{Pl}{AE}$$

where $\delta^-$=Displacement (when pulling force is below pre-tension value)
l=Length of the securing member between the pulling nut 122 and the nut 116
A=Cross sectional area under tension
E=Modulus of elasticity of securing member material Referring to the graph of FIG. 5, it can be seen that displacement ($\delta$) is a linear or substantially linear function of the pulling force P. Once the pulling force P exceeds the pre-tension force T, then the entire length of the securing member will begin to stretch or elongate. The basic equation is the same, but the length used in the equation is the entire length of the bolt.

$$\delta^+ = \frac{PL}{AE}$$

where $\delta^+$=Displacement (when pulling force is above pre-tension value)
L=Length of the securing member from the nut 122 to the end 130 (where it attaches to embedment ring)
A=Cross sectional area under tension
E=Modulus of elasticity of securing member material Referring again to FIG. 3, it can be seen that there is a change in slope of the graph when the applied force is equal to the pre-tension T. It has been found that an unknown value of the pre-tension T can be determined if a first relationship between applied force and displacement is known for applied forces less than the pre-tension T (i.e., a relationship 140 for points to the left of the pre-tension T), and a second similar relationship is known for applied forces greater than the pre-tension T (i.e., a relationship 144 for points to the right of the pre-tension T). These first and second relationships can be set to equal each other, and solved, to determine the unknown pre-tension T. Stated differently, a solution for both relationships can be solved for by equating the two different slopes of the curve at their intersection 142 (or interpreting the intersection from a graphical representation).

Specifically, the first relationship 140 can be determined by measuring the displacements for at least two different pulling forces P that are less than the unknown pre-tension T. Similarly, the second relationship 144 can be determined by measuring the displacements for at least two pulling forces P that are greater than the unknown pre-tension T.

Following is an example of a representative calculation:

| Using pulling tool, apply the following pulling forces to the securing member: | Using the displacement measuring device, measure the associated displacement values for the pulling forces P1 to P4: |
|---|---|
| P1 = 0.50 * T | δ1 |
| P2 = 0.75 * T | δ2 |
| P3 = 1.05 * T | δ3 |
| P4 = 1.10 * T | δ4 |

Then, the following equations can be stated for each relationship, including the slope (m) and intercept (b) values for each, because the relationships are assumed to be linear:

$$\delta^- = m^- \times p + b^- \text{ and } \delta^+ = m^+ \times p + b^+$$

where the minus (−) superscripts are used to designate the first relationship 140 describing the behavior below the pre-tension T value and the plus (+) superscripts are used to designate the relationship 144 above the pre-tension T value.

If the two equations are set to equal each other, then they can be solved for the pulling force where the displacements are equal. This pulling force will be the current pre-tension.

$$\delta^- = m^- p + b^- = m^+ p + b^+ = \delta^+$$

$$m^- p + b^- = m^+ p + b^+$$

$$m^- p - m^+ p = b^+ - b^-$$

$$p(m^- - m^+) = b^+ - b^-$$

$$p = \frac{b^+ - b^-}{m^- - m^+} = \text{Value of Pretension}$$

The basic equation for displacement vs. pulling force for a shaft of constant cross-sectional area is $$\delta = \frac{PL}{AE}$$

In the approach set forth above, however, the values of the modulus of elasticity E for the securing member material, the cross-sectional area A of the securing member and the overall length of the securing member L need not be known. This is advantageous for at least several reasons. First, specific parameters for any securing member might not be known and/or may be very difficult to verify. For example, records of the overall lengths of a group of securing members may have existed at the time of installation, but could be lost or otherwise unavailable at the time of future maintenance years in the future. The overall length L of the securing member is very difficult or impossible to verify with sufficient accuracy after installation because the end 130 is buried many feet below the surface. The modulus of elasticity E, the area A and other similar quantities arguably could be determined in the field, but doing so would make the process more complicated and more prone to error.

FIG. 5 is a flow chart describing steps of a representative method for determining a pre-tension force in a securing member of a foundation. According to one scenario, the method is used during a maintenance routine to determine whether the current pre-tension in the securing member, which is unknown, meets requirements or needs adjustment. In step 200, a pulling member is coupled to a securing member. In step 210, the pulling member is used to generate a pulling force on the securing member. In step 220, the displacement of the securing member in response to the pulling force is measured. As indicated, multiple pulling forces are generated and multiple associated displacements are measured. In step 230, the multiple pulling force displacements and the known pulling forces are used to determine one or more relationships. The relationships can be determined mathematically or, in some cases, taken from a graph thereof. In step 240, the pre-tension of the securing member is determined. The process of FIG. 5 can be repeated for each securing member of the foundation, or a subset thereof, according to the applicable testing and evaluation practices. In some cases, depending upon the determined pre-tension value for a given securing member, additional steps can be taken to increase or to decrease the pre-tension.

Figure 6:
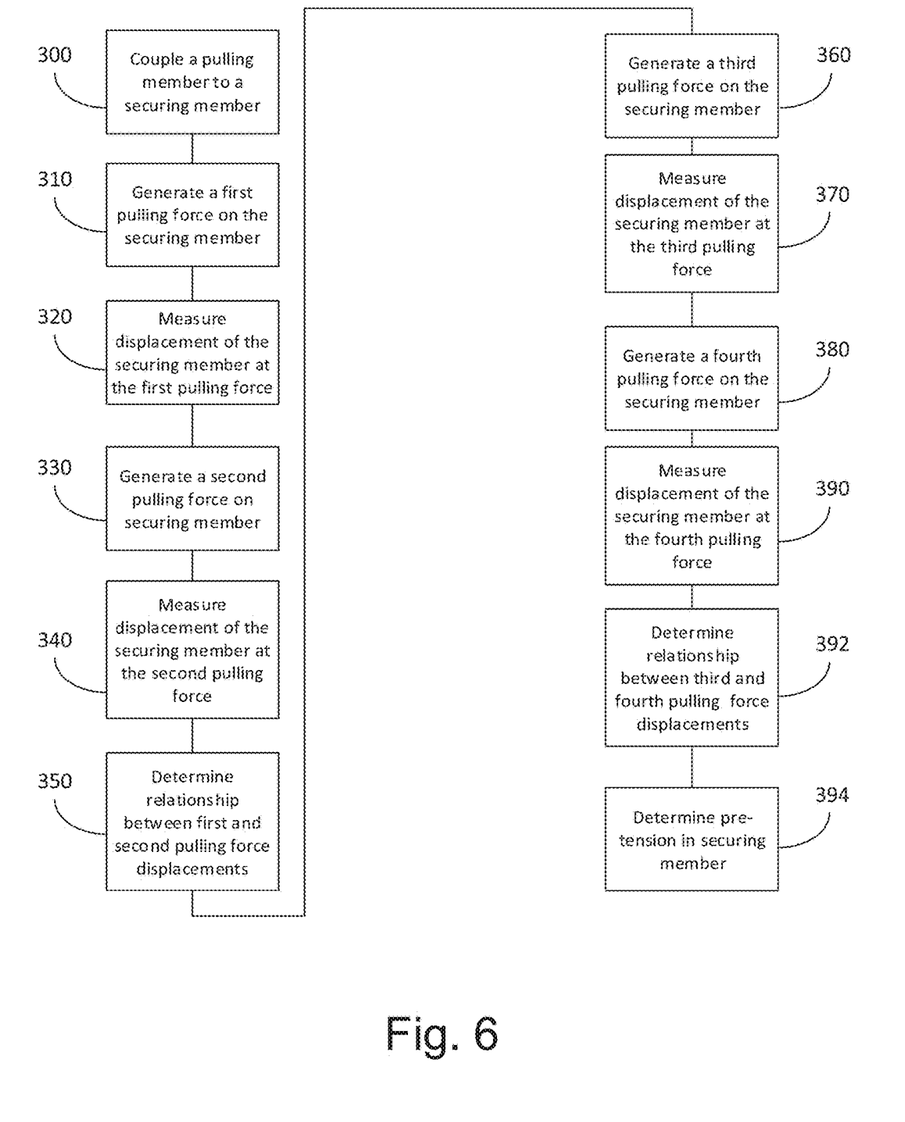
FIG. 6 is a flow chart of another method for determining pre-tension in the securing member.

FIG. 6 is a flow chart describing steps of another representative method for determining a pre-tension force in a securing member. In step 300, a pulling member is coupled to a securing member. In step 310, the pulling member is used to generate a first pulling force on the securing member (which is below the expected pre-tension). In step 320, the displacement of the securing member at the first pulling force is measured, such as with the displacement measuring device 124 or another suitable device. In step 330, a second pulling force, which is greater than the first pulling force but below the expected pre-tension, is generated. In step 340, the displacement of the securing member at the second pulling force is measured. In step 350, a relationship between the first and second pulling force displacements and the pulling forces is determined. In step 360, a third pulling force greater than the expected pre-tension is generated. In step 370, the displacement of the securing member at the third pulling force is measured. In step 380, a fourth pulling force on the securing member, which is greater than the third pulling force, is generated. In step 390, the displacement of the securing member at the fourth pulling force is measured. In step 392, a relationship between the third and fourth pulling force displacements and the pulling forces is determined. In step 394, the relationship between the first and second pulling force displacements is set to equal the relationship between the third and fourth pulling force displacements and solved to determine a pre-tension in the securing member.

In the above methods, although the current pre-tension in a specified securing member is unknown, it is assumed pulling forces at values below and above an expected pre-tension value can be selected to develop the relationships as described. In some cases, a selected pulling force may not define the appropriate relationship, and therefore the pulling force needs to be changed. For example, if the first and second pulling forces are selected to be below the expected pre-tension value and to define a first relationship, but the third pulling force follows the same relationship, then the third pulling force is not above the current pre-tension, and a higher pulling force must be selected. The process of selecting a different pulling force may need to be repeated until there are at least two points generating a second, different relationship from the first relationship. As shown in FIG. 3, this is because a change in slope, i.e., a step change in the graph, occurs at the intersection 142. In some embodiments, the various pulling forces and associated displacements are input into a computing device automatically by the measuring devices or manually entered by the user, and the calculations are performed with the computing device. In some embodiments, the computing device is programmed to display the displacements and pulling forces graphically such that the first relationship can be visualized after the second pulling force measurement. If the third pulling force measurement produces a third pulling force displacement that falls on the same line as the first and second pulling force displacements, then it is apparent that the third pulling force is not above the current pretension, and a higher pulling force must be applied. The user would then repeat the process until an appropriate second relationship different from the first relationship (e.g., a second line at a slope different from a first line) can be discerned from the graphical depiction or the computing device otherwise indicates that sufficient pulling force data has been collected.

Exemplary Computing Environment

The techniques and solutions described herein, particularly relating to measuring forces, displacements, performing calculations and displaying graphical information, can be performed by software, hardware, or both as elements of a computing environment, such as one or more computing devices. For example, computing devices include server computers (including PLC server computers), desktop computers, laptop computers, notebook computers, handheld devices, netbooks, tablet devices, mobile devices, PDAs, and other types of computing devices. A special purpose computing device could also be used.

Figure 7:
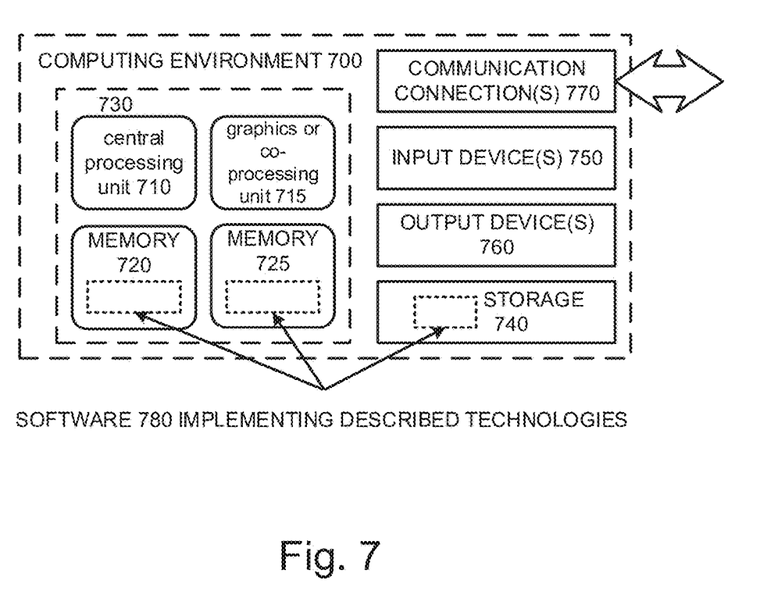
FIG. 7 is a block diagram of a representative computing environment suitable for implanting the technologies described herein.

FIG. 7 illustrates a generalized example of a suitable computing environment 700 in which the described technologies can be implemented. The computing environment 700 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the enterprise computing platform technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, programs and program modules may be located in both local and remote memory storage devices.

With reference to FIG. 7, the computing environment 700 includes at least one processing unit 710 coupled to memory 720. In FIG. 7, this basic configuration 730 is included within a dashed line. The processing unit 710 executes computer-executable instructions and may be a real or a virtual processor (e.g., executing on one or more hardware processors). In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 can store software 780 implementing any of the technologies described herein.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other computer-readable media which can be used to store information and which can be accessed within the computing environment 700. The storage 740 can store software 780 containing instructions for any of the technologies described herein.

The input device(s) 750 may be a touch input device such as a keyboard, mouse, pen, or trackball, a voice input device, a scanning device, or another device that provides input to the computing environment 700. For audio, the input device(s) 750 may be a sound card or similar device that accepts audio input in analog or digital form, or a CD-ROM reader that provides audio samples to the computing environment. The output device(s) 760 may be a display, printer, speaker, CD-writer, relay, motion control card, or another device that provides output from the computing environment 700.

The communication connection(s) 770 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the computer-readable media herein can be non-transitory (e.g., memory, magnetic storage, optical storage, or the like).

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Any of the methods described herein can be implemented by computer-executable instructions stored in one or more computer-readable storage devices (e.g., memory, magnetic storage, optical storage, or the like). Such instructions can cause a computer to perform the methods.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method to determine an unknown, current pre-tension in a pre-tensioned securing member having an exposed portion, comprising:
    coupling a pulling member to the exposed portion of the pre-tensioned securing member;
    generating pulling forces with the pulling member on the pre-tensioned securing member;
    measuring pulling force displacements of the pre-tensioned securing member in response to first and second applied pulling forces that are different from each other;
    measuring pulling force displacements of the pre-tensioned securing member in response to third and fourth pulling forces that are different from each other;
    determining a first relationship between the first and second pulling force displacements;
    determining a second relationship between the third and fourth pulling force displacements; and
    determining the current pre-tension in the pre-tensioned securing member by setting the first relationship and the second relationship equal to each other.

2. The method of claim 1, wherein the first and second pulling forces are less than the current pre-tension force.

3. The method of claim 1, wherein the third and the fourth pulling forces are greater than the current pre-tension force.

4. The method of claim 1, wherein a total length of the pre-tensioned securing member is unknown.

5. The method of claim 1, wherein a cross-sectional area of the pre-tensioned securing member is unknown.

6. The method of claim 1, wherein a modulus of elasticity of the pre-tensioned securing member is unknown.

7. The method of claim 1, wherein the first relationship between the first and second pulling forces comprises a linear relationship.

8. The method of claim 1, wherein the second relationship between the third and fourth pulling forces comprises a linear relationship.

9. The method of claim 1, wherein the first and second pulling forces are selected to be less than an expected value of the current pre-tension force.

10. The method of claim 1, wherein the third and fourth pulling forces are selected to be greater than an expected value of the current pre-tension force.

11. The method of claim 1, further comprising comparing the determined current pre-tension force to a reference pre-tension force, and adjusting the current pre-tension force to equal the reference pre-tension force.

12. The method of claim 1, wherein the pre-tensioned securing member is a first anchor bolt of a plurality of anchor bolts in a wind tower foundation structure.

13. The method of claim 11, wherein the exposed portion of the pre-tensioned securing member is an exposed portion of the first anchor bolt extending above a base flange of the wind tower foundation.

14. The method of claim 13, wherein the first anchor bolt comprises a concealed portion extending below the base flange.

15. The method of claim 14, wherein the current pre-tension force of the first anchor bolt can be determined even if the length of the concealed portion of the first anchor bolt is unknown.

16. The method of claim 12, wherein further comprising completing the method for at least a second anchor bolt of the wind tower foundation.

17. A method to determine an unknown, current pre-tension in a pre-tensioned securing member having an exposed portion, comprising:
    coupling a pulling member to the exposed portion of the pre-tensioned securing member;
    generating pulling forces with the pulling member on the pre-tensioned securing member;
    measuring pulling force displacements of the pre-tensioned securing member in response to at least two lower applied pulling forces that are different from each other;
    determining a first relationship between the pulling force displacements for the lower applied pulling forces;
    measuring pulling force displacements of the pre-tensioned securing member in response to at least two higher applied pulling forces that are different from each other until it is determined that a second relationship different from the first relationship is defined;
    determining the current pre-tension in the pre-tensioned securing member by setting the first relationship and the second relationship equal to each other.

18. A device to determine an unknown current pre-tension in a pre-tensioned securing member having an exposed portion, comprising:
    a memory;
    a processor connected to the memory and having a pre-tension calculator, wherein the pre-tension calculator:
        receives first and second pulling force displacements of the pre-tensioned securing member corresponding to first and second pulling forces applied to the securing member that are different from each other;
        stores the first pulling force displacement and the first pulling force in association with each other;
        stores the second pulling force displacement and the second pulling force in association with each other;
        receives third and fourth pulling force displacements of the pre-tensioned securing member corresponding to third and fourth pulling forces applied to the securing member that are different from each other;
        stores the third pulling force displacement and the third pulling force in association with each other;
        stores the fourth pulling force displacement and the fourth pulling force in association with each other;
        determines a first relationship between the first and second pulling force displacements;
        determines a second relationship between the third and fourth pulling force displacements; and
        determines the current pre-tension in the pre-tensioned securing member by setting the first relationship and the second relationship equal to each other.

19. The device of claim 18, further comprising a display for displaying the current pre-tension determined by the pre-tension calculator.

20. A computer-readable medium having stored thereon program code, the program code executable by a computer to perform operations comprising:

receiving first and second pulling force displacements of the pre-tensioned securing member corresponding to first and second pulling forces applied to the securing member that are different from each other;

storing the first pulling force displacement and the first pulling force in association with each other;

storing the second pulling force displacement and the second pulling force in association with each other;

receiving third and fourth pulling force displacements of the pre-tensioned securing member corresponding to third and fourth pulling forces applied to the securing member that are different from each other;

storing the third pulling force displacement and the third pulling force in association with each other;

storing the fourth pulling force displacement and the fourth pulling force in association with each other;

determining a first relationship between the first and second pulling force displacements;

determining a second relationship between the third and fourth pulling force displacements; and determining the current pre-tension in the pre-tensioned securing member by setting the first relationship and the second relationship equal to each other.

\* \* \* \* \*